United States Patent [19]
Grosskopf et al.

[11] Patent Number: 5,546,574
[45] Date of Patent: Aug. 13, 1996

[54] PEER-TO-PEER DATA CONCURRENCE PROCESSES AND APPARATUS

[75] Inventors: Joseph R. Grosskopf, Park Ridge; Hasan S. Niaz, Naperville, both of Ill.; Carolyn K. Reuss, Atlanta, Ga.; Jerry C. Shih, Roswell, Ga.; Paul T. Watson, Alpharetta, Ga.

[73] Assignees: AT&T Corporation, N.Y.; Bell South Corporation, Atlanta, Ga.

[21] Appl. No.: 268,623

[22] Filed: Jun. 30, 1994

[51] Int. Cl.⁶ .................................................... G06F 17/30
[52] U.S. Cl. .................... 395/600; 395/200.12; 379/58; 379/38; 379/201; 379/23; 370/60; 364/282.4; 364/222.2; 364/974.7; 364/919.4; 364/DIG. 1; 364/DIG. 2
[58] Field of Search ..................... 395/600, 200.12; 379/379, 58, 38, 201, 211; 379/58, 38, 201, 211; 370/60, 110.1

[56] References Cited

U.S. PATENT DOCUMENTS

| | | | |
|---|---|---|---|
| Re. 24,529 | 2/1994 | Bicknell et al. | 379/220 |
| 4,466,060 | 8/1984 | Riddle | 395/200 |
| 4,500,960 | 2/1985 | Babecki et al. | 395/280 |
| 4,614,841 | 9/1986 | Babecki et al. | 379/98 |
| 4,656,658 | 4/1987 | King | 379/221 |
| 4,685,125 | 8/1987 | Zave | 379/96 |
| 4,734,854 | 3/1988 | Afshar | 395/700 |
| 4,736,402 | 4/1988 | Landis | 379/16 |
| 4,747,127 | 5/1988 | Hansen et al. | 379/94 |
| 4,757,264 | 7/1988 | Lee et al. | 328/63 |
| 4,763,317 | 8/1988 | Lehman et al. | 370/58 |
| 4,805,209 | 2/1989 | Baker, Jr. et al. | 379/96 |
| 4,919,545 | 4/1990 | Yu | 380/25 |
| 4,926,495 | 5/1990 | Comroe et al. | 455/54 |
| 4,939,771 | 7/1990 | Brown et al. | 379/67 |
| 4,942,602 | 7/1990 | Baker, Jr. et al. | 379/212 |
| 4,972,461 | 11/1990 | Brown et al. | 379/67 |
| 4,984,234 | 1/1991 | Vergnaud et al. | 370/58.1 |
| 5,003,584 | 3/1991 | Benyacar et al. | 379/113 |
| 5,008,929 | 4/1991 | Olsen et al. | 379/112 |
| 5,008,930 | 4/1991 | Gawrys et al. | 379/210 |
| 5,056,086 | 10/1991 | Libonati | 370/62 |
| 5,130,982 | 7/1992 | Ash et al. | 370/85.7 |
| 5,153,907 | 10/1992 | Pugh et al. | 379/143 |
| 5,182,744 | 1/1993 | Askew et al. | 370/16 |

(List continued on next page.)

OTHER PUBLICATIONS

Berman et al., "Perspective on the AIN Architecture", *IEEE Communications Magazine*, vol. 30, No. 2, Feb., 1992, pp. 27–32.

(List continued on next page.)

*Primary Examiner*—Thomas G. Black
*Assistant Examiner*—Paul R. Lintz
*Attorney, Agent, or Firm*—James L. Ewing, Esq. IV; Kilpatrick & Cody

[57] ABSTRACT

Data concurrence processes and systems for maintaining concurrence of parallel sets of data stored in telecommunication Network Elements. According to a preferred embodiment of such processes, a Network Element such as a Service Node sends a Request Message to a second Network Element such as a Source Service Control Point in order to update data on that Source. The Source then sends a Request Message to the other Network Element, such as a Target Service Control Point, in order to update the parallel data contained in that Service Control Point. The Network Elements whose data are updated may send appropriate Result Messages in order to verify integrity of the data. The processes and apparatus also allow resynchronization of the data to occur at desired predetermined interval. These data concurrence processes and systems are particularly useful for implementing new services such as Personal Number Calling services in an intelligent telecommunications network, because they allow updating of the parallel databases quickly, efficiently, and with a minimum of required coordination, management and opportunity for lost communications, stale data, and mishandled call processing.

13 Claims, 5 Drawing Sheets

U.S. PATENT DOCUMENTS

| | | | |
|---|---|---|---|
| 5,187,710 | 2/1993 | Chau et al. | 370/110.1 |
| 5,193,110 | 3/1993 | Jones et al. | 379/94 |
| 5,206,901 | 4/1993 | Harlow et al. | 379/211 |
| 5,212,727 | 5/1993 | Ramkumar | 379/221 |
| 5,251,255 | 10/1993 | Epley | 379/242 |
| 5,276,444 | 1/1994 | McNair | 340/825.33 |
| 5,278,823 | 1/1994 | Handel | 370/13 |
| 5,282,244 | 1/1994 | Fuller et al. | 379/230 |
| 5,353,331 | 10/1994 | Emery et al. | 379/58 |
| 5,392,390 | 2/1995 | Crozier | 395/161 |
| 5,495,484 | 2/1996 | Self et al. | 370/110.1 |

OTHER PUBLICATIONS

R. A. White, "Implementation of the BellSouth Advanced Intelligent Network", *1992 International Zurich Seminar on Digital Communications, Intelligent Networks and their Applications,* Zurich Switzerland, 16–19 Mar. 1992, pp. D3/1–5.

Carnazza et al., *1st International Conference on Universal Personal Communications ICPU '92 Proceedings,* 29 Sep.–1 Oct., Dallas, Texas, p. 12.04/1–5.

Shimizu et al., "Evolution of an Intelligen Network", *TENCON '92. "Technology Enabling Tomorrow", 1992 IEEE Region 10 International Conference. Computers, Communications and Automation Towards the 21st Century,* Melbourne, Vic, Australia, 11–13 Nov. 1992, pp. 474–478.

C. Sleath, "The Intelligent Network—Fact or Fantasy", *IEE. The Intelligent Network—Fact or Fantasy/Tutorial Seminar,* 16 Feb. 1993, Conventry, UK, pp. 1/1–4.

H. Schonbauer, "Experience of the Deutsche Bundepost IN Trial", *IEE. The Intelligent Network—Fact or Fantasy/Tutorial Seminar,* 16 Feb. 1993, Conventry, UK, pp. 8/1–4.

Carol Wilson, "The Public Network Gets Personal", *Telephony,* vol. 220, No. 16, Apr. 22, 1991, pp. s30–s33.

Kwon et al., "A Fail–Safe Architecture of Service Control and Management System for Intelligent Networks, *Proceedings of the Fourth Workshop on Future Trends of Distributed Computing Systems",* 22–24 Sep. 1993, Lisbon, Portugal, pp. 69–73.

Garrahan et al., "Intelligent Network Overview", *IEEE Communications Magazine,* vol. 31., No. 3, Mar. 1993, pp. 30–36.

Barclay et al., "Emerging Intelligent Network Services: A Corridor to Personal Communications", *Fourth IEE Conference on Telecommunications,* 18–21 Apr. 1993, Mancester, UK, pp. 217–220.

O'Reilly et al., "Experiences in Prototyping the Intelligent Network", *IEEE in Houston. GLOBECOM '93. IEEE Global Telecommunications Conference, including a Communications Theory Mini–Conference. Technical Program Conference Record,* 29 Nov.–2 Dec. 1993, pp. 1923–1930, vol. 3.

AT&T A–L Net™ Products, Custom Routing Service, Service Manual, Issue 1, May 1993, pp. 40–41.

PEER-TO-PEER DATA CONCURRENCE PROCESSES AND APPARATUS

This invention relates to processes and apparatus for maintaining data concurrence between databases found in intelligent telecommunications networks, such as those databases that contain information relating to services desired by telecommunications services subscribers.

BACKGROUND OF THE INVENTION

Intelligent telecommunications networks have engendered a number of new and interesting services for telecommunications subscribers. Call routing, calling card checks, call screening, and identifying callers are some of the services which may now be supported by intelligent networks. The intelligent networks also now permit real time creation and modification of customized features and services desired by particular subscribers. An example is Personal Number Calling, in which a person may request that she or he be reached at one location for particular times of the day and at another location for other times, all using the same telephone number, but subject to change immediately.

Intelligent networks are well suited to address these new additional demands flexibly, efficiently and reliably. Information relating to the status of services and features desired by subscribers may be maintained in intelligent Network Elements ("NEs") such as (but not limited to) conventional Advanced Intelligent Network ("AIN") Service Control Points ("SCPs"), Service Nodes ("SNs"), other Intelligent Peripherals ("IPs"), or other intelligent Network Elements which are available for query by central offices, switches and similar elements of the telecommunications switching network. Such subscribers may be those who subscribe to telecommunications, cable or television programming, multimedia or other services which may be provided on any information infrastructure, regardless of nature or bandwidth.

According to certain BellSouth Telecommunications intelligent network architecture, as a conventional (but non-limiting) example, data corresponding to the status of services and features for particular subscribers in a Personal Number Calling context may be stored in Service Control Points. Appropriate logic, located in the Service Control Point or in a Service Node, is invoked by a call from a particular subscriber who wishes to make a change to her or his subscriber changeable data. The logic verifies the data from the subscriber and updates the subscriber's data. If the logic resides in a Service Node, it sends, via an X.25 link, an update message to the appropriate Service Control Point that contains the subscriber's data.

For a number of reasons, it is desirable to maintain concurrent, redundant data corresponding to the same subscriber but located on different machines or even at different geographical sites. In BellSouth Telecommunications intelligent networks, for instance, there are at least two databases which store data for a particular subscriber. Each database resides in a different Service Control Point, and the Service Control Points are sometimes located geographically remotely from each other. (Each of the Service Control Points also preferably contains a parallel set of data mirrored locally/internally in conventional fashion on tandem devices.) The redundancy offered by these mated Service Control Point helps cover the unavoidable system failures and maintenance periods, but it also allows load sharing among Service Control Points as well as the capacity to designate active or standby Service Control Points in an effort to distribute the load across the network.

The conspicuous and primary disadvantage of such redundant databases is that they will inevitably fail to contain the same data at some point. For instance, during subscriber changeable data updating efforts, a particular relevant Service Control Point may be out of service or communications links may be lost. Data concurrence must obviously be restored quickly in such case, and in any event before the Service Control Point resumes call processing.

Even if platform or communications failures are discounted or ignored, reconciliation between the databases must occur in real time and reliably, since calls may be processed by either Service Control Point at any time depending on management and control of the network. Subscriber services such as Personal Number Calling only exacerbate this requirement, since, for example, a subscriber who is entering a change may be walking out the door and expecting calls in her car in the next few minutes.

Other conventional techniques for updating parallel databases such as those found in remotely located Service Control Points include communicating the update information simultaneously to the databases. Such techniques typically address the data reconciliation or synchronization issue with "audit" software in every application that corresponds to each database. This audit software seeks to synchronize data between the mated databases by, among other things, recording information relating to any data for which an update failure occurs by reason of failure to synchronize with other applications, link failures, out-of-service conditions, or otherwise. If the software is unable to synchronize the data, it sets a "data audit" timer and attempts to synchronize again when the timer expires. Data changes can be missed during such audits, however, and they in any event require appreciable effort and coordination.

These conventional approaches to data concurrence fail to resolve the multiple needs associated with updating and reconciling redundant databases in mated Network Elements and applications reliably, efficiently, quickly and with a minimum of management and coordination.

SUMMARY OF THE INVENTION

The present invention provides systems and processes in which one Network Element in a pair that contains redundant databases updates and thus reconciles with its mate Network Element. This process is referred to as peer-to-peer data concurrency since the two mated Network Elements are of equal stature, either can initiate the update process, and no supervising controller or superior database exists. For instance, at a database level, when an application at one Service Control Point has received subscriber changeable data, that data is updated and identified as changed, and the application causes corresponding information to be transmitted to the relevant application in the mate Service Control Point together with (preferably but not necessarily) information about the sending application address, receiving application address, subscriber identification and data identification. The application in the mate Service Control Point checks the received data for errors, updates its database and returns a message to the first Service Control Point with data. The first Service Control Point reviews the result, and if successful, the process ends. If the returned data is an error message, an error report is generated and synchronization efforts are terminated and may be rescheduled for later. If there is no reply from the mate Service Control Point, the application assumes that its mate is out of service or not ready and then schedules a resynchronization process to occur a predetermined time later. If the resynchronization process fails, an error report is generated and the audit is rescheduled.

It is thus an object of the present invention to eliminate confusion that otherwise occurs in an information infrastructure when one Network Element or similar entity simultaneously attempts to update two others and is forced to reconcile situations when updates have failed on either or both Network Elements.

It is an additional object of the present invention to provide improved processes and systems for maintaining data concurrence in redundant telecommunications databases, which processes and systems operate quickly, efficiently, and reliably.

It is a further object of the present invention to provide improved processes and systems for synchronizing databases at predetermined intervals.

It is a further object of the present invention to provide improved processes and systems for synchronizing databases, which may be automatically controlled and/or manually started or stopped.

Other objects, features, and advantages of the present invention will become apparent with respect to the remainder of this document.

DETAILED DESCRIPTION OF THE DRAWINGS

Context

Figure 1:
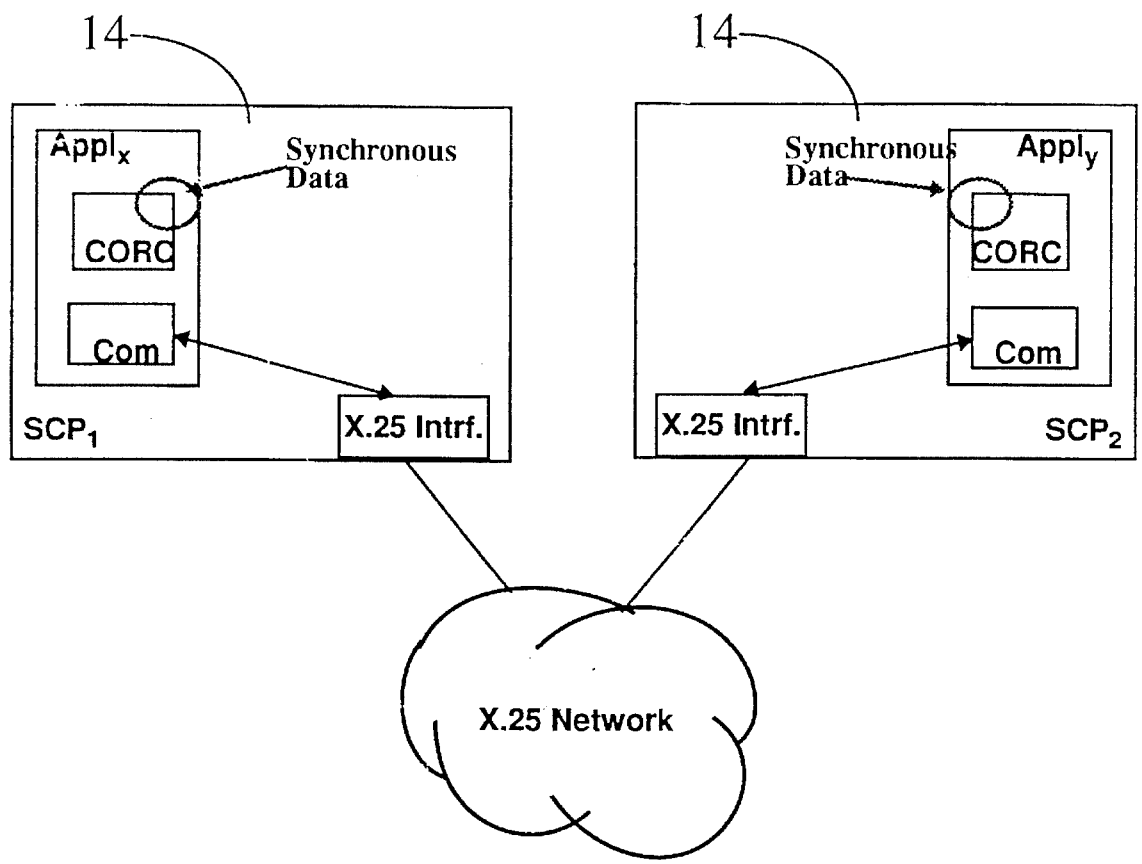
FIG. 1 is a contextual schematic showing X.25 communication relationships among conventional telecommunications Network Elements.

A conventional X.25 application design is shown in FIG. 1 for context purposes. X.25 communication design is used in the present preferred embodiment in order to communicate between Network Elements such as Service Control Points 14 (discussed later), although other protocol and architecture could be used in the future.

Overview

In the present embodiment, X.25 communication design may be employed in order to update data. Use of X.25 communication design allows the Service Node application to update one of the mated Service Control Point pair (the Source). Data synchronization then occurs automatically across the Service Control Point pair between Source and Target according to the present invention.

Although the Service Node is referred to as the originating entity in this disclosure, updating may originate from any suitable entity or component, including but not limited to Service Nodes, Service Control Points, Intelligent Peripherals, other Network Elements, switching devices, personal computers, Customer Premises Equipment of any sort, equipment of other network providers, cellular roaming platforms, home location registers, or cellular switches. Similarly, the updated entities may be Service Control Points, but they may just as easily be any entity in which information relating to information infrastructure subscribers is located. For sake of convenience, however, the originating entities are referred to collectively in this document as "Service Nodes" or "Control Network Elements," while the entities whose data are being updated are referred to collectively as "Service Control Points," "Target Network Elements" or "Source Network Elements."

The X.25 data communication design forms a portion of the Service Node logic in the preferred embodiment. The X.25 update logic is invoked by a call from a subscriber who desires changes to her or his services (and thus data, which may be, for purposes of this disclosure, subscriber changeable data). The Service Node logic collects the data from the subscriber, verifies it and passes control to the X.25 update part of the logic which constructs an address or routing string for the particular subscriber which is employed in the destination Service Control Point for routing. It then sends an X.25 update Request Message to either one of the Service Control Points.

The X.25 communication logic is also part of the Service Control Point logic. It essentially performs three functions, which, collectively provide the peer-to-peer data concurrency: (a) updates local subscriber changeable data; (b) synchronizes the mated Service Control Point; and (c) resynchronizes the mated Service Control Point for out-of-sync subscriber records. The first two functions occur in the preferred embodiment typically when a subscriber is updating her or his subscriber changeable data. The third function occurs only if subscriber records are unsynchronized and the resynchronization process is not inhibited.

The "Update Subscriber Data" portion of X.25 communication logic accepts Request Messages sent by a Service Node or mated Service Control Point in order to update the subscriber's data. A Success Return Result message is sent back to the sending Network Element if the update succeeds, a Failure Return Message if the update fails.

The "Synchronize The Mated Service Control Point" portion of the X.25 communication logic is a continuation of the "Update Subscriber Data" application design. After the subscriber profile is successfully updated locally, this portion builds a Synchronization Update Request Message to the mated Service Control Point (assuming that the requested change was received from a Service Node). This message contains the same update information as the Request Message from the Service Node. If this message cannot be delivered to the mated Service Control Point, the subscriber changeable data is marked out-of-sync and a Resync Process will be scheduled to resynchronize the mated Service Control Point at a later time.

The resynchronization event or "Resync Process" is a scheduled event that attempts to synchronize the mated Service Control Point with local subscriber records that are marked out-of-sync. The Resync Process occurs only if out-of-sync subscriber records exist as denoted by flags. An out-of-sync flag is set by "Synchronize The Mated Service Control Point" logic When an update to its mate Service Control Point fails. The Resync Process is a process which remains in memory after the normal call process handling is completed. Only one Resync Process may run at any time, and a craft person may interrupt the process. The interruption can be either via inhibit or stop during the process. The messages are routed via conventional X.25 interfaces. The interfaces route a message using the routing string when available. Alternatively, the message may be routed using any identifier of the process, such as the Subsystem Number (SSN), if provided. According to the preferred embodiment, the message is delivered via the SSN only when there is a transmission or application error.

Each message preferably contains a header and a body, consistent with X.25 protocol. The header includes elements needed to route the message to the destination; it preferably has a generic fixed format. The body preferably contains relevant subscriber changeable data.

Scenarios

Figure 2:
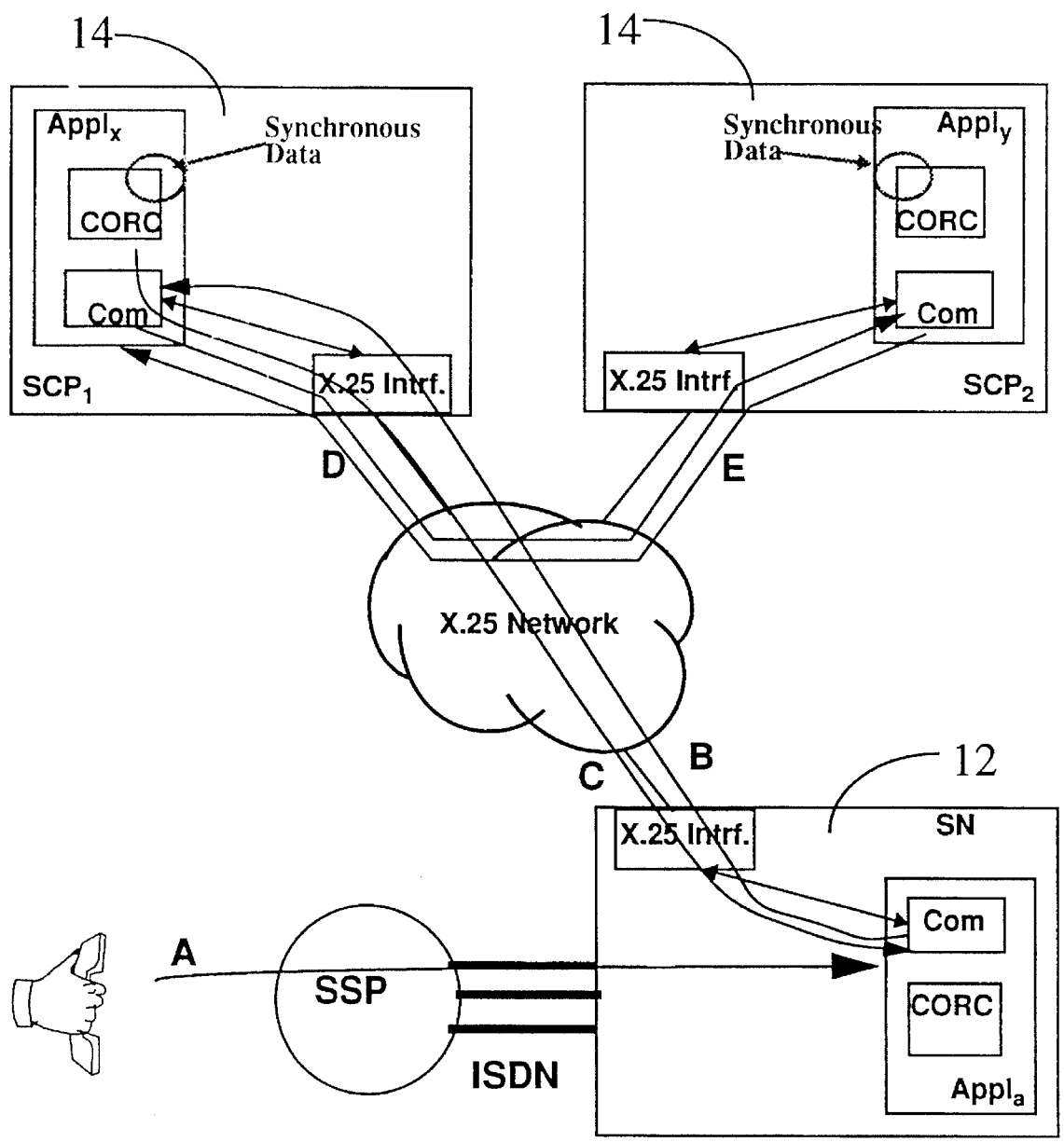
FIG. 2 shows a first update scenario according to a preferred embodiment of the present invention.
Figure 3:
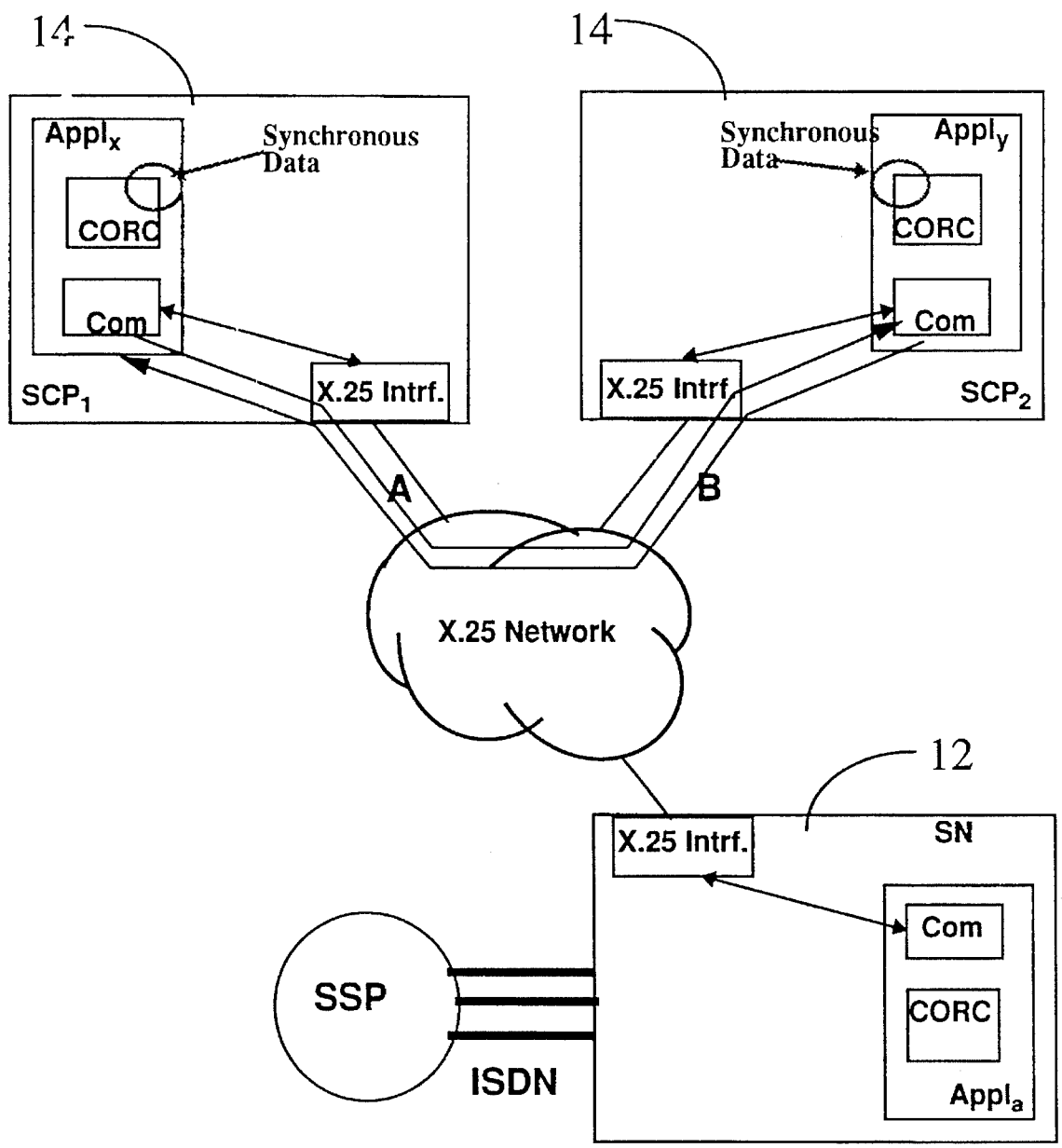
FIG. 3 shows a second update scenario according to a preferred embodiment of the present invention.

FIGS. 2 and 3 show certain scenarios which may occur in connection with systems and processes according to the present invention. Note that such peer-to-peer data concurrency processes according to the present invention are occurring at application level, any description which may appear inconsistent notwithstanding. FIG. 2 shows an update scenario in which the first update succeeds. In step A, a subscriber originates a call to update subscriber changeable data. The call is routed to a Service Node 12. The Service Node 12 originates a Request Message with new subscriber changeable data to Source SCP1 (numeral 14) in step B. (SCP1 may be either SCP in the pair.) In step C, SCP1 receives the new data, updates relevant data, and returns a Success Result Message to Service Node 12. The Source SCP1 originates a Request Message with new data to its mate and Target, SCP2 (numeral 14), in step D. In step E, SCP2 updates its subscriber profile and returns a Success Result Message to SCP1.

FIG. 3 shows a resynchronization process in which a subscriber's data is unsynchronized between mated Service Control Point pairs and thus prime for Resync Process. A Resync Process is scheduled when an update to a mated Service Control Point fails. FIG. 3 assumes SCP1 receiving a failure when attempting to update SCP2. SCP1 has then scheduled a Resync Process in order to perform data resynchronization. In step A, a Resync Process is activated in SCP1 for data resynchronization. The logic reviews all relevant subscriber profiles in an effort to locate out-of-sync subscriber records for that service application. A Request Message is constructed for every out-of-sync record and for transmission to the mated SCP, SCP2. In step B, the Target SCP, SCP2, receives the Request Message, updates its subscriber profile if appropriate, and returns a Success Result Message. If the data is newer in SCP2, then the newer data is sent back to SCP1 to update. SCP1 may repeat step A until all subscriber profiles have been examined and updated. SCP2 repeats step B as necessary.

Flow

Figure 4:
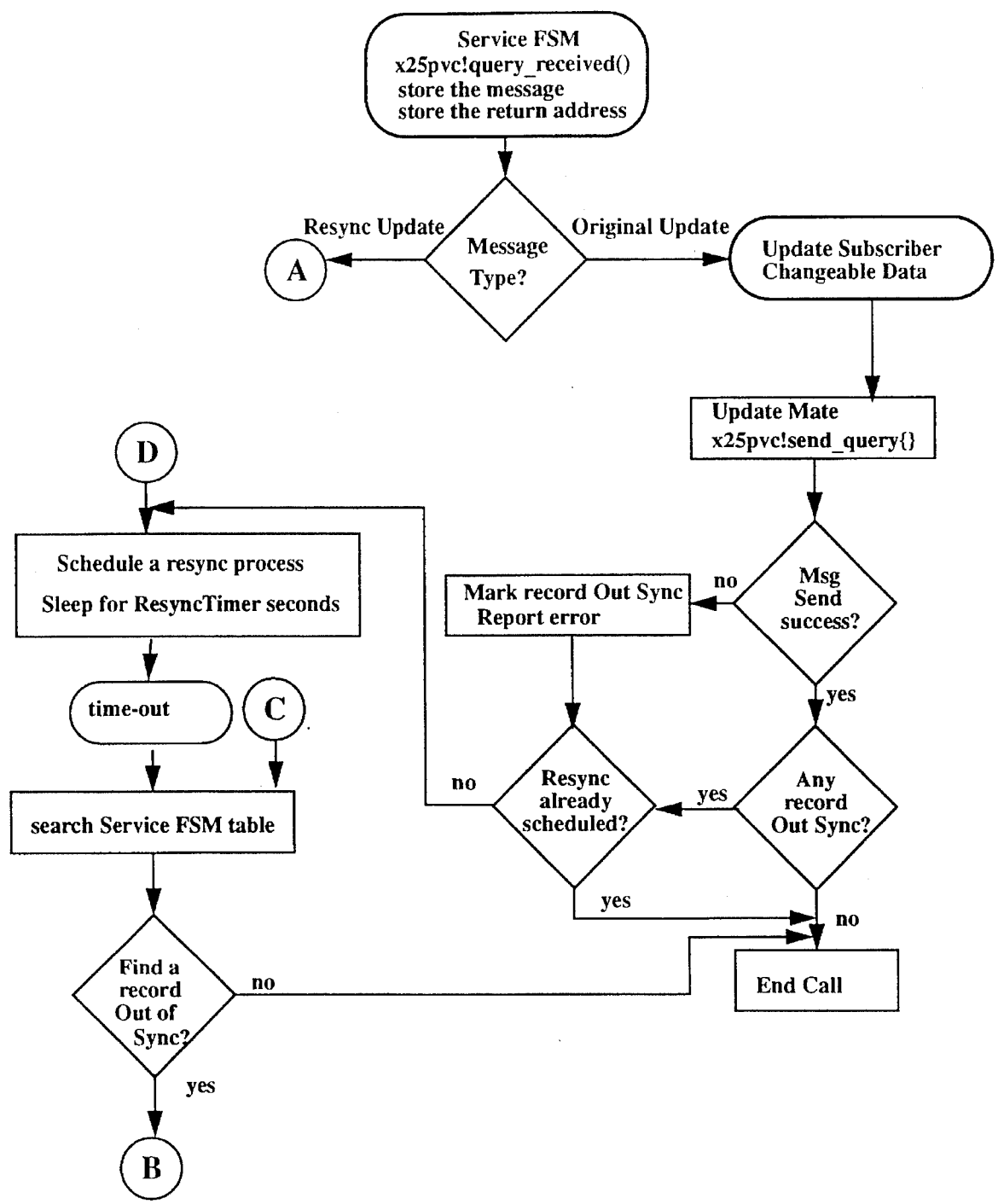
FIGS. 4 and 5 together constitute a flow diagram of certain logic employed in systems and processes according to a preferred embodiment of the present invention.
Figure 5:
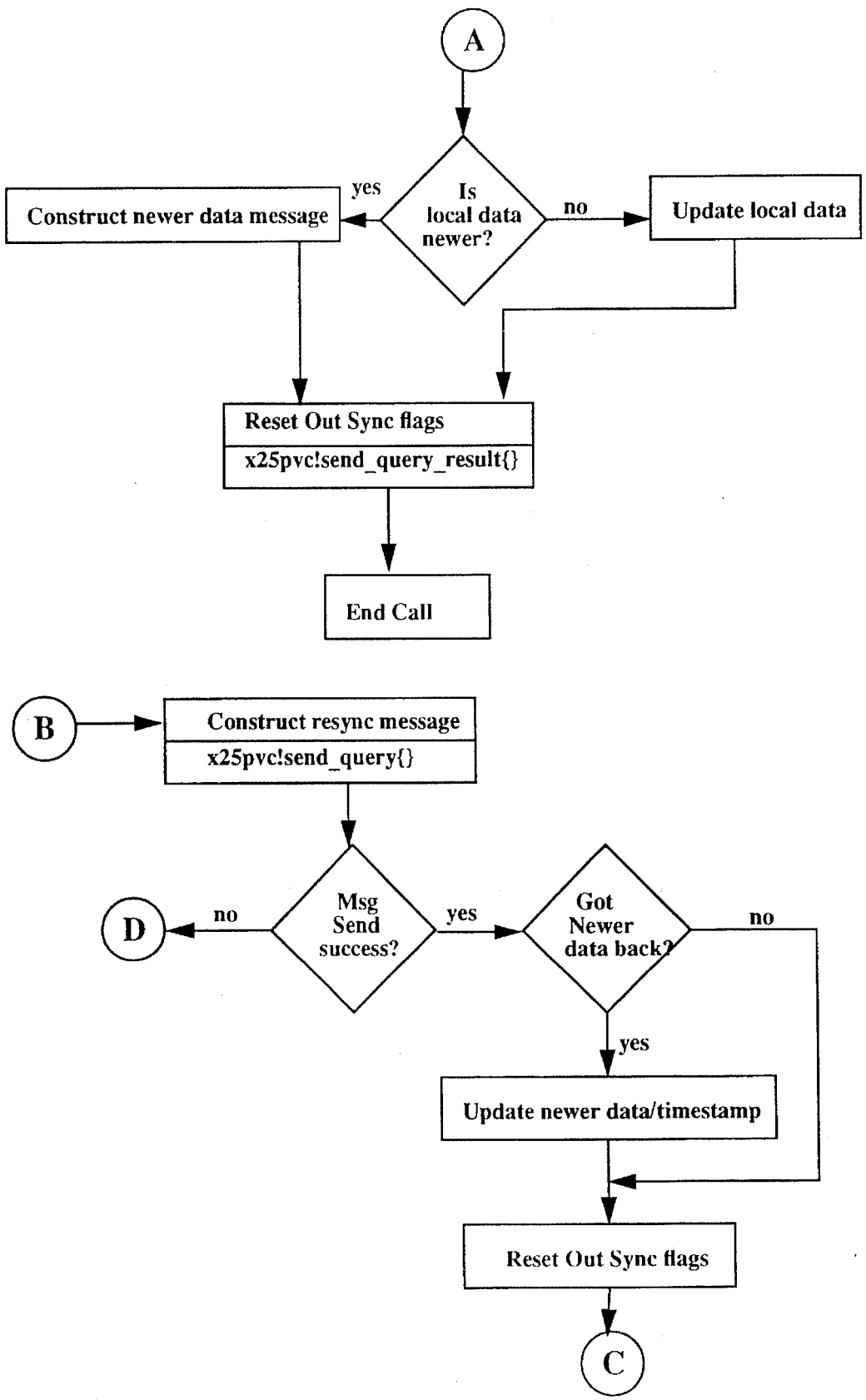

FIGS. 4 and 5 collectively show, in a self explanatory fashion, flow according to a preferred embodiment of the present invention for updating Network Elements and for the Resync process. An Update Message is received and saved later to synchronize the mated Service Control Point. The message is interpreted and local subscriber changeable data is updated. The Service Control Point then attempts to update the mated Service Control Point. If the Update Message is not delivered successfully to the mated Service Control Point, then the appropriate record is marked out of sync and a Resync process scheduled if it has not been already. If the attempt succeeds, then the Update Message is interpreted and local subscriber changeable data is updated on the mated SCP.

FIGS. 4 and 5 also show a Resync Process flow according to design of the preferred embodiment. A timer expires and the Resync Process begins, as shown in FIG. 4. If an out-of-sync record is found, a Resync Message is built and sent to the mated Service Control Point. If the Resync Message is successfully sent, and a return message shows newer data, then local Service Control Point data is updated. If all of the out-of-sync records have been successfully synchronized, then Sync Flags are set, the call ended, and a new Resync Process is awaited.

FIG. 5 additionally shows the Resync process from the Target point of view. If the relevant local data is newer than that contained in the message, then a NewerData Result Message is built, the local data is included in the Result Message, and that message is returned to the Source. If older, updating occurs. Sync Flags are reset and the call ended.

The foregoing is provided for purposes of explanation and disclosure of a preferred embodiment of the present invention. Upgrades, changes, revisions, new versions, and/or migrations to new platforms, software, architecture, protocols or standards may be implemented without departing from the scope or spirit of the present invention.

What is claimed is:

1. A process for maintaining peer to peer data concurrence in a plurality of concurrent and redundant databases, each of which is contained at least in part in its corresponding telecommunications Network Element, comprising the steps of:

a. providing to a Service Node information relating to changes that are desired in data stored in the databases and corresponding to a particular subscriber;

b. communicating to a Source Network Element that contains at least one of the databases, from the Service Node, a First Request Message that contains information about the data in the concurrent and redundant databases that is desired to be changed;

c. attempting to change information in the database in the Source Network Element based on information in the First Request Message received by the Source Network Element;

d. communicating to the Service Node from the Source Network Element a First Result Message regarding level of success in changing the data in the Source Network Element database;

communicating to a Target Network Element that contains the database that is desired to be maintained as concurrent to said database in the Source Network Element, from the Source Network Element, a Synchronization Request Message that contains information about the data that is desired to be changed in said database in the Target Network Element in Order to cause said Target Network Element database to be concurrent to said Source Network Element database;

f. attempting to change information in the Target Network Element database based on information in the Synchronization Request Message received by the Target Network Element in order to cause said Target Network Element database to be concurrent and redundant with said Source Network Element database; and g. communicating to the Source Network Element from the Target Network Element a Second Result Message regarding level of success in changing the data in the Target Network Element database and thus whether said Target Network Element database is concurrent and redundant to said Source Network Element database.

2. A process according to claim 1 further comprising the step of setting out of sync flags corresponding to data changes which have not occurred in the Target Network Element database.

3. A process according to claim 1 further comprising the step of scheduling a resynchronization process if data changes have not occurred to cause said Source Network Element database and said Target Network Element database to be concurrent.

4. A process according to claim 1 in which, if appropriate Result Messages are not received indicating successful data changes, the process is discontinued.

5. A process according to claim 1 in which the Source Network Element and the Target Network Element are Service Control Points.

6. A process according to claim 1 in which the Request Messages and the Result Messages are sent using X.25 data links.

7. A process for maintaining peer to peer data concurrence in a pair of concurrent and redundant databases, each of which is contained in a corresponding telecommunications Service Control Point, comprising the steps of:
   a. providing to a Service Node information relating to changes that are desired in data stored concurrently and redundantly in the databases and corresponding to a particular subscriber;
   b. communicating to one of the Service Control Points that contains one of the databases (the "Source SCP"), from the Service Node, a First Request Message that contains information about the data in the databases that is desired to be changed;
   c. attempting to change information in said Source SCP database based on information in the First Request Message received by the Source SCP;
   d. communicating to the Service Node from the Source SCP a First Result Message regarding level of success in changing the data in the Source SCP database;
   e. communicating to a Target Service Control Point ("Target SCP") that contains the database that is desired to be maintained as concurrent and redundant to said database in the Source SCP, from the Source SCP, a Synchronization Request Message that contains information about the data that is desired to be changed in said Target SCP database in order to cause said Target SCP database to be concurrent and redundant to said Source SCP database;
   f. attempting to change information in the Target SCP database based on information in the Synchronization Request Message received by the Target SCP in order to cause said Target SCP database to be concurrent and redundant to said Source SCP database; and
   g. communicating to the Source SCP from the Target SCP a Second Result Message regarding level of success in changing the data in the Target SCP database and thus whether said Target SCP database is concurrent with said Source SCP database.

8. A process according to claim 7 in which Second Result Messages are also sent to other Service Control Points in addition to the one which sent the Synchronization Request Message.

9. A process according to claim 7 in which the Request Messages and the Result Messages are sent using X.25 data links.

10. Apparatus for maintaining peer to peer data concurrence in a plurality of concurrent and redundant databases, each contained in a corresponding Network Element in a telecommunications network, comprising:
   a. a Service Node adapted to receive information regarding data in at least one of the databases which is desired to be changed;
   b. means in the Service Node for preparing an original update request message that contains information about the data that is desired to be changed;
   c. means for communicating the original update request message to a Source Network Element in Order to change data in the concurrent and redundant database in the Source Network Element;
   d. means in the Source Network Element for changing information in the concurrent and redundant database in the Source Network Element based on information in the original update request message received by the Source Network Element;
   e. means in the Source Network Element for preparing a synchronization update request message that contains information about the data that is desired to be changed;
   f. means for communicating the synchronization update request message to a Target Network Element in order to change data in the concurrent and redundant database in the Target Network Element that is concurrent and redundant to the concurrent and redundant database in the Source Network Element; and
   g. means in the Target Network Element for changing information in the concurrent and redundant database in the Target Network Element based on information in the synchronization update request message received by the Target Network Element.

11. Apparatus according to claim 10 further comprising means in each Network Element for preparing a synchronization result message to be sent to the Network Element from which a corresponding synchronization update request message was received, regarding level of success in accomplishing data changes requested in the request message to the concurrent and redundant database in the Network Element sending the result message.

12. Apparatus according to claim 10 in which the Source Network Element and the Target Network Element are Service Control Points.

13. Apparatus according to claim 10 in which the means for sending the update request messages and the synchronization update request messages comprises X.25 data links.

* * * * *